US011887833B2

(12) United States Patent
Iwamoto et al.

(10) Patent No.: US 11,887,833 B2
(45) Date of Patent: Jan. 30, 2024

(54) ION TRAP MASS SPECTROMETER, MASS SPECTROMETRY METHOD AND NON-TRANSITORY COMPUTER READABLE MEDIUM STORING CONTROL PROGRAM

(71) Applicant: SHIMADZU CORPORATION, Kyoto (JP)

(72) Inventors: Shinichi Iwamoto, Kyoto (JP); Sadanori Sekiya, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 74 days.

(21) Appl. No.: 17/638,062

(22) PCT Filed: Jun. 4, 2020

(86) PCT No.: PCT/JP2020/022208
§ 371 (c)(1),
(2) Date: Feb. 24, 2022

(87) PCT Pub. No.: WO2021/059600
PCT Pub. Date: Apr. 1, 2021

(65) Prior Publication Data

US 2022/0277951 A1 Sep. 1, 2022

(30) Foreign Application Priority Data

Sep. 27, 2019 (JP) ................................ 2019-177979

(51) Int. Cl.
*H01J 49/42* (2006.01)

(52) U.S. Cl.
CPC ................................ *H01J 49/4265* (2013.01)

(58) Field of Classification Search
CPC .................................................. H01J 49/4265
USPC ........................................ 250/281, 282, 283
See application file for complete search history.

(56) References Cited

U.S. PATENT DOCUMENTS

| | | | | |
|---|---|---|---|---|
| 7,193,207 | B1 | 3/2007 | Ding et al. | |
| 2001/0010355 | A1 | 8/2001 | Umemura | |
| 2010/0282963 | A1* | 11/2010 | Remes | H01J 49/4225 250/282 |

FOREIGN PATENT DOCUMENTS

| | | | |
|---|---|---|---|
| JP | 2001-210268 | A | 8/2001 |

OTHER PUBLICATIONS

Li Ding et al., "A simulation study of the digital ion trap mass spectrometer", International Journal of Mass Spectrometry, Nov. 2002, 23 pgs., vol. 12294.
N.V. Konenkov et al., "Matrix Methods for the Calculation of Stability Diagrams in Quadrupole Mass Spectrometry", Journal American Society for Mass Spectrometry, 2002, pp. 597-613, vol. 13.

(Continued)

*Primary Examiner* — Nicole M Ippolito
(74) *Attorney, Agent, or Firm* — Sughrue Mion, PLLC

(57) ABSTRACT

An ion trap mass spectrometer includes an ion trap including a first electrode and a second electrode different from the first electrode, a first voltage controller that periodically switches a DV voltage among DC voltages having a plurality of values and apply the DV voltages to the first electrode, and a second voltage controller that applies a sine-wave voltage to the second electrode when ions captured in the ion trap are dissociated.

7 Claims, 9 Drawing Sheets

(56) References Cited

OTHER PUBLICATIONS

Li Ding et al., "A digital ion trap mass spectrometer coupled with atmospheric pressure ion sources", Journal of Mass Spectrometry, 2004, pp. 471-484., vol. 39.
International Search Report for PCT/JP2020/022208 dated, Aug. 18, 2020 (PCT/ISA/210).
Written Opinion of the International Searching Authority for PCT/JP2020/022208 dated, Aug. 18, 2020 (PCT/ISA/237).

* cited by examiner

ION TRAP MASS SPECTROMETER, MASS SPECTROMETRY METHOD AND NON-TRANSITORY COMPUTER READABLE MEDIUM STORING CONTROL PROGRAM

CROSS REFERENCE TO RELATED APPLICATIONS

This application is a National Stage of International Application No. PCT/JP2020/022208 filed Jun. 4, 2020, claiming priority based on Japanese Patent Application No. 2019-177979 filed Sep. 27, 2019.

TECHNICAL FIELD

The present invention relates to an ion trap mass spectrometer, a mass spectrometry method and a non-transitory computer readable medium storing a control program.

BACKGROUND ART

With an ion trap mass spectrometer, ions captured in an ion trap are dissociated, and mass separation is performed on the ions generated by this dissociation for detection (see Patent Document 1.) In the ion trap, ions are captured by application of a sine-wave voltage or a square-wave voltage to an electrode arranged around the space in which ions are captured. In case of a Digital Ion Trap (DIT) for applying a square-wave voltage and capturing ions, there are advantages that mass separation can be performed easily by frequency modulation because a resonator is not required, a high-voltage power supply for amplitude modulation is not required, etc. Behavior of ions in the ion trap is studied by theory and simulation (see Non-Patent Document 1, Non-Patent Document 2 and Non-Patent Document 3.)

CITATION LIST

Patent Document

[Patent Document 1] JP 2001-210268 A
[Patent Document 2] U.S. Pat. No. 7,193,207 B1

Non-Patent Document

[Non-Patent Document 1] Ding L, Sudakov M, Kumashiro S. "A simulation study of the digital ion trap mass spectrometer" International Journal of Mass Spectrometry, (Holland), Elsevier, Nov. 15, 2002, Volume 221, Issue 2, pp. 117-138
[Non-Patent Document 2] Konenkov N V, Sudakov M, Douglas D J. "Matrix methods for the calculation of stability diagrams in quadrupole mass spectrometry" Journal of the American Society for Mass Spectrometry, (US), Elsevier, June 2002, Volume 13, Issue 6, pp. 597-613
[Non-Patent Document 3] Ding L, Sudakov M, Brancia F L, Giles R, Kumashiro S. "A digital ion trap mass spectrometer coupled with atmospheric pressure ion sources" Journal of mass spectrometry, (England), Wiley, May 2004, Volume 39, Issue 5, pp. 471-484

SUMMARY OF INVENTION

Technical Problem

In a case in which ions are dissociated with use of an ion trap, mass spectrometry is performed accurately.

Solution to Problem

A first aspect of the present invention relates to an ion trap mass spectrometer including an ion trap including a first electrode and a second electrode different from the first electrode, a first voltage controller that periodically switches a DC voltage among DC voltages having a plurality of different values and apply the DC voltages to the first electrode, and a second voltage controller that applies a sine-wave voltage to the second electrode when ions captured in the ion trap are dissociated.

A second aspect of the present invention relates to a mass spectrometry method with which an ion trap mass spectrometer including an ion trap, including a first electrode and a second electrode different from the first electrode, is used and which includes periodically switching a DC voltage among DC voltages having a plurality of different values and applying the DV voltages to the first electrode, and applying a sine-wave voltage to the second electrode when ions captured in the ion trap are dissociated.

A third aspect of the present invention relates to a non-transitory computer readable medium storing a control program for causing a processing device to execute a process of controlling an ion trap mass spectrometer including an ion trap including a first electrode and a second electrode different from the first electrode, and the process includes a first voltage control process of periodically switching a DC voltage among DC voltages having a plurality of different values and applying the DC voltages to the first electrode, and a second voltage control process of applying a sine-wave voltage to the second electrode when ions captured in the ion trap are dissociated, and the control program causes a computer to execute the process.

Advantageous Effects of Invention

With the present invention, in a case in which ions are dissociated with use of an ion trap, mass spectrometry can be performed accurately.

DESCRIPTION OF EMBODIMENTS

Embodiments of the present invention will be described below with reference to the drawings.

Figure 1:
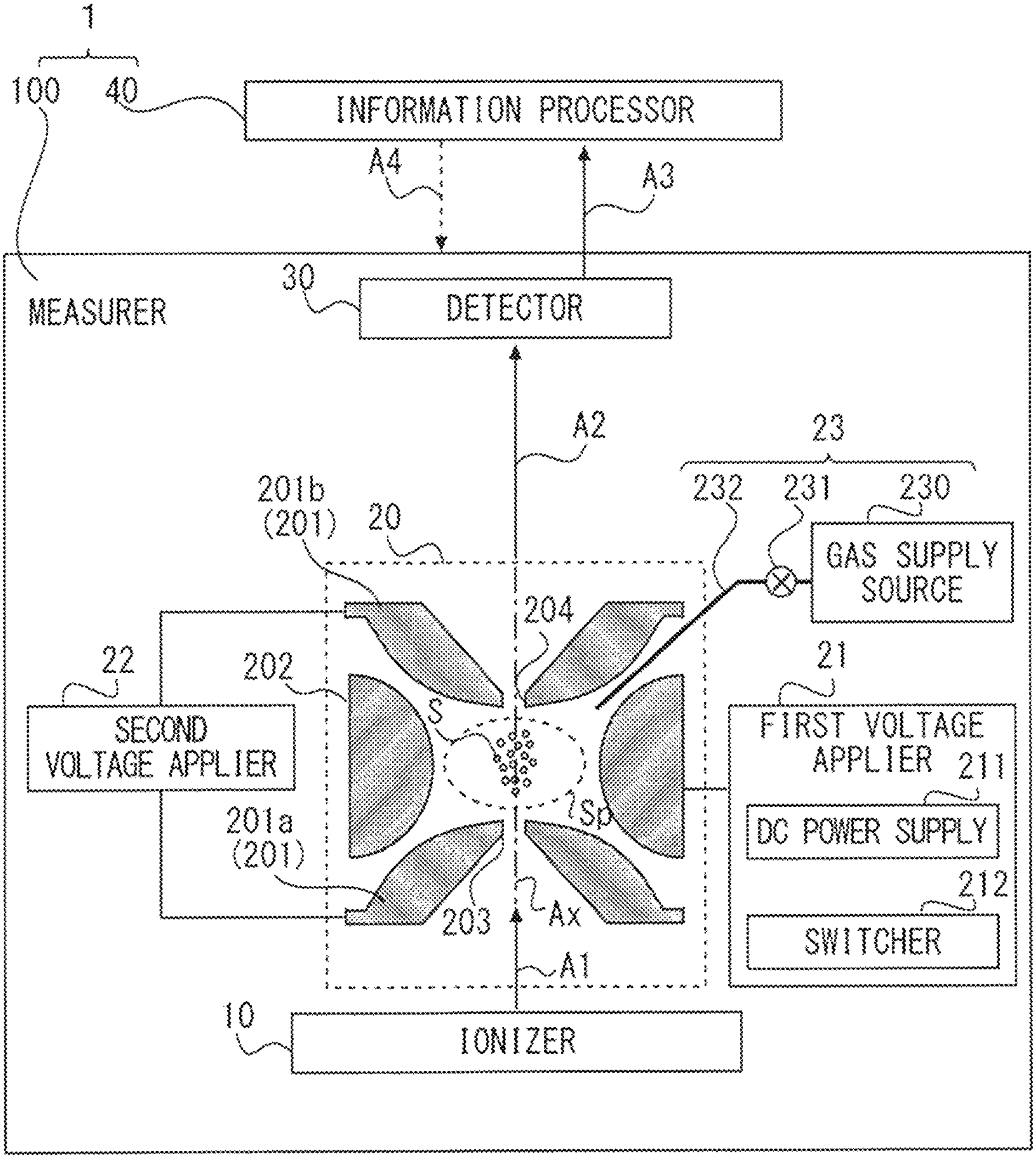
FIG. 1 is a conceptual diagram showing the configuration of an ion trap mass spectrometer of one embodiment.

FIG. 1 is a conceptual diagram showing the configuration of an ion trap mass spectrometer of the present embodiment. The ion trap mass spectrometer 1 includes a measurer 100 and an information processor 40. The measurer 100 includes an ionizer 10, an ion trap 20 that captures sample-derived ions S, a first voltage applier 21, a second voltage applier 22, a gas supplier 23 and a detector 30. The ion trap 20 includes an end-cap electrode 201, a ring electrode 202, an ion inlet port 203 and an ion ejection port 204. The end-cap electrode 201 includes an inlet end-cap electrode 201*a* and an outlet end-cap electrode 201*b*. The first voltage applier 21 includes a Direct Current (DC) power supply 211 and a switcher 212. The gas supplier 23 includes a gas supply source 230, a valve 231 and a gas introducer 232.

The measurer 100 analyzes a sample and outputs data obtained by measurement in regard to sample-derived ions S to the information processor 40.

The ionizer 10 of the measurer 100 is configured to include an ion source and ionizes molecules included in a sample. An ionization method is not limited in particular. For example, Matrix Assisted Laser Desorption/Ionization (MALDI) or Electrospray Ionization (ESI) can be used. The sample-derived ions S generated by ionization performed by the ionizer 10 are moved by electromagnetic action or the like based on a voltage applied to an electrode (not shown) and introduced into the ion trap 20 through the ion inlet port 203 provided in the inlet end-cap electrode 201*a* (the arrow A1).

The ion trap 20 according to the present embodiment is a three-dimensional quadrupole ion trap. The sample-derived ions S introduced through the ion inlet port 203 are captured in the space Sp surrounded by the end-cap electrode 201 and the ring electrode 202. The end-cap electrode 201 and the ring electrode 202 are rotationally symmetrical with respect to a center axis Ax, and the surfaces facing the space Sp in the end-cap electrode 201 and the ring electrode 202 are preferably formed to make hyperbolas in the cross section including the center axis Ax.

The ion trap 20 includes a plurality of electrodes. As long as it is possible to capture ions in the ion trap 20 by applying a voltage from the first voltage applier 21 to at least one of these electrodes, their types and shapes are not limited in particular. For example, the ion trap 20 can be a linear ion trap.

The first voltage applier 21 applies a square-wave voltage to the ring electrode 202. The DC power supply 211 includes at least one voltage source configured to output DC voltages having a plurality of different values. The switcher 212 includes a switching element such as MOSFET (Metal-Oxide-Semiconductor Field-Effect Transistor) and switches a DV voltage among the above-mentioned DC voltages having a plurality of different values to apply them to the ring electrode 202. The switcher 212 applies a square wave to the ring electrode 202 by periodically switching a DC voltage between 2 DC voltages having different values at a predetermined frequency to apply them to the ring electrode 202.

The amplitude of a square wave applied to the ring electrode 202 by the first voltage applier 21 is not limited in particular as long as precursor ions to be dissociated can be captured. For example, the difference between a voltage in a high-voltage range and a voltage in a low-voltage range of this square wave or the difference between the two voltages output by the DC power supply 211 is preferably from 400 V to 2 kV.

The frequency of a square wave applied to the ring electrode 202 by the first voltage applier 21 is controlled by the first voltage controller 511 (FIG. 2) as described below. The frequency of this square wave, in other words, the frequency at which the switcher 212 switches a DC voltage is set based on an m/z (equivalent to a mass-to-charge ratio) of precursor ions included in sample-derived ions S, or the like.

Figure 2:
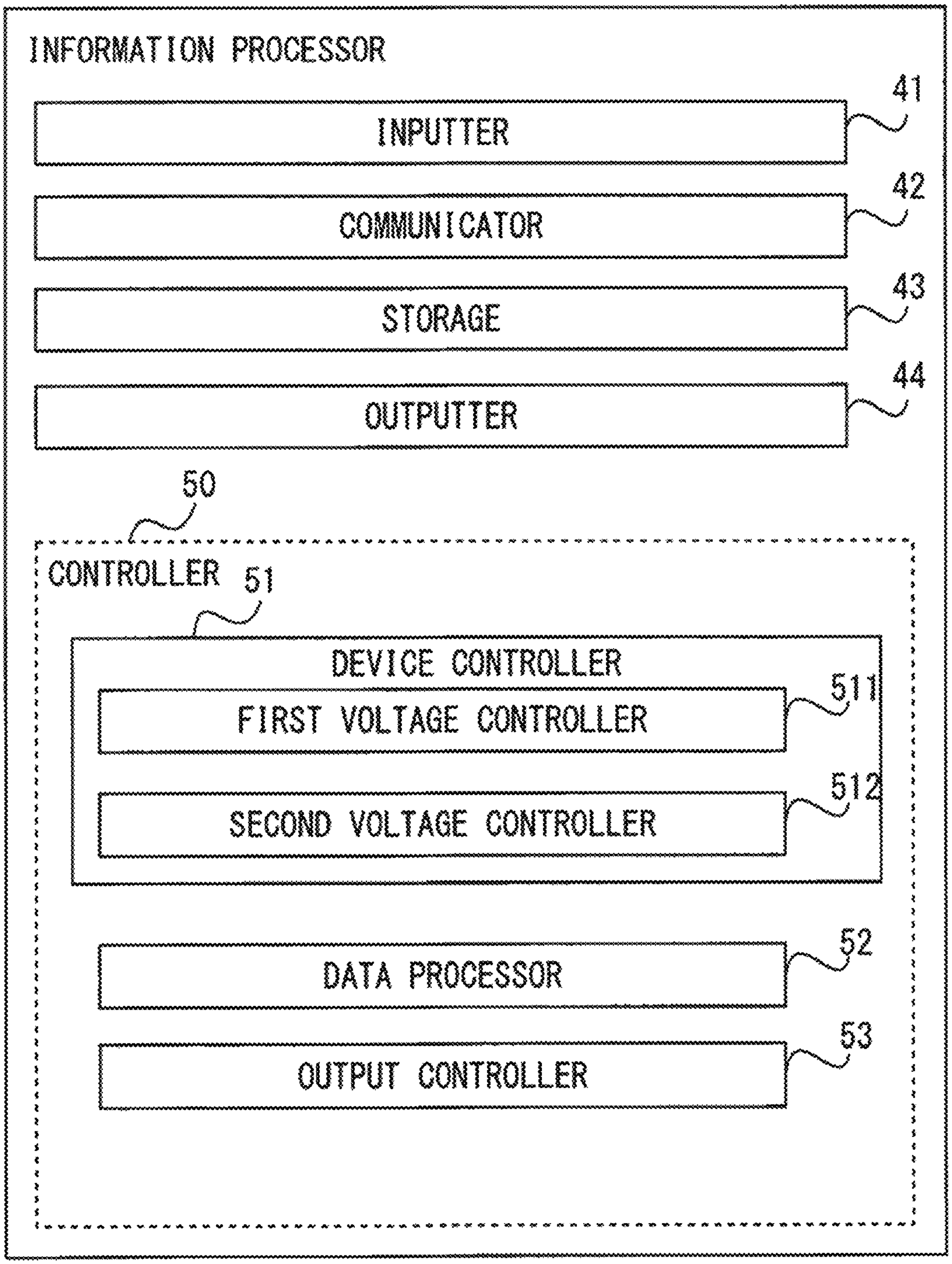
FIG. 2 is a conceptual diagram showing the configuration of an information processor.

The second voltage applier 22 applies a sine-wave voltage to the end-cap electrode 201 due to the control by the second voltage controller 512 (FIG. 2). The second voltage applier 22 includes a Digital/Analog (D/A) converter. The second voltage controller 512 outputs a digital sine-wave signal to the second voltage applier 22 during dissociation. The dissociation is Collision-Induced Dissociation (CID). The second voltage applier 22 converts the digital signal into an analog sine-wave voltage using the D/A converter, applies the sine-wave voltage to one of the inlet end-cap electrode 201*a* and the outlet end-cap electrode 201*b* and applies the voltage of the reversed phase of the sine wave to the other one of the inlet end-cap electrode 201*a* and the outlet end-cap electrode 201*b*.

As long as a sine-wave voltage can be applied to the ring electrode 202, the configuration of the second voltage applier 22 is not limited in particular. A sine wave may be generated with use of an analogue circuit without the D/A conversion.

The frequency of a sine wave to be applied to the end-cap electrode 201 by the second voltage applier 22 is preferably based on the secular frequency of precursor ions as described below in detail. While not being limited in particular as long as dissociation is performed with desired accuracy, the amplitude of the sine wave can be from 0.1 V to 2.0 V.

Figure 3:
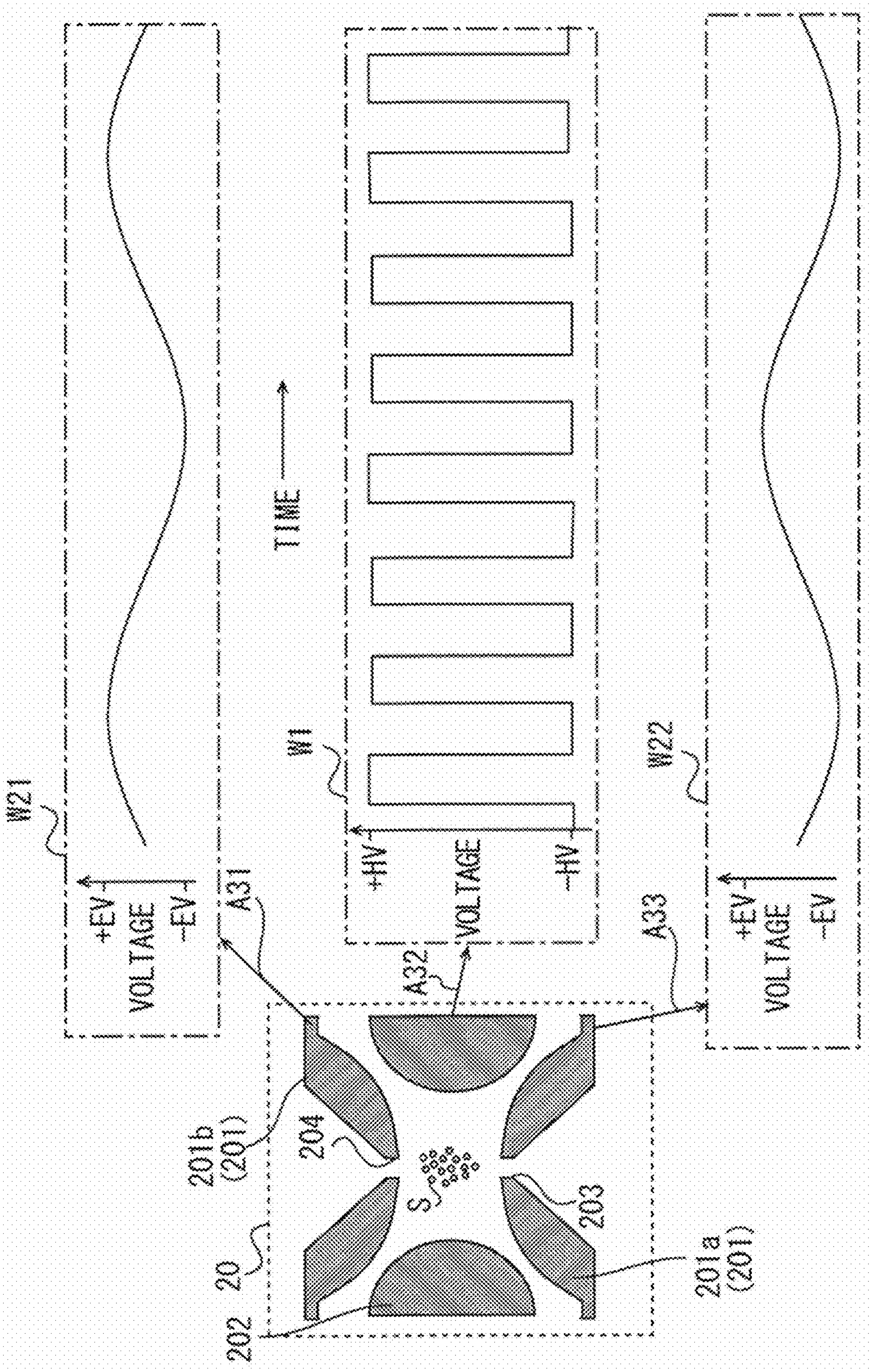
FIG. 3 is a conceptual diagram showing a waveform of a voltage applied to an electrode of the ion trap according to the one embodiment.

FIG. 3 is a conceptual diagram schematically showing the waveforms representing voltages to be applied to the end-cap electrode 201 and the ring electrode 202. In the graph showing the waveforms W1, W21 and W22, the ordinate indicates a voltage value of an electrode, and the abscissa indicates the time. In FIG. 3, the association between the respective waveforms W21, W1 and S22 and respective electrodes to which voltages represented by the waveforms are applied are schematically indicated by the arrows A31, A32 and A33.

The waveform W1 represents a square wave applied to the ring electrode 202 by the first voltage applier 21. In regard to a square wave, a voltage value in a high-voltage range is +HV, and a voltage value in a low-voltage range is −HV. The waveforms W21 and W22 respectively represent voltages to be applied to the outlet end-cap electrode 201*b* and the inlet end-cap electrode 201*a*. In regard to a sine-wave voltage, a maximum value is +EV, and a minimum value is −EV. Because of the effects of an electric field and a magnetic field generated in the space Sp by the voltage applied to the end-cap electrode 201 by the second voltage applier 22, the sample-derived ions S are resonantly excited and collide with molecules included in a CID gas, described below, to be dissociated.

The ion trap 20 can selectively capture or eject sample-derived ions S based on their m/z. For example, in the ion trap 20, after ions having an m/z equal to or larger than a predetermined m/z are captured by Low Mass Cut Off (LMCO), the second voltage applier 22 applies a Filtered Noise Field (FNF) signal or a Stored Wave Inverse Fourier Transform (SWIFT) signal or the like to the end-cap electrode 201. Thus, precursor ions can be separated (presence of a plurality of ions is also assumed.)

The ion trap 20 can eject sample-derived ions S from the ion ejection port 204 while performing mass separation due to resonance excitation ejection. In this resonance excitation ejection, a square-wave voltage being synchronized with a frequency of a square-wave voltage applied to the ring electrode 202 and then having a frequency obtained by suitable division of the square-wave voltage is applied to the end-cap electrode 201 by the second voltage applier 22. In this state, the first voltage applier 21 scans the frequency in a direction to reduce the frequency of the square-wave voltage applied to the ring electrode 202. Thus, ions are selectively resonantly excited in an ascending order of m/z and ejected from the ion trap 20 while mass separation is being performed on the ions. Alternatively, in the above-mentioned state, the first voltage applier 21 scans a frequency in a direction to increase a frequency of a square-wave voltage applied to the ring electrode 202. Thus, ions are selectively resonantly excited in a descending order of m/z and ejected from the ion trap 20 while mass separation is being performed on the ions.

Returning to FIG. 1, the ion-derived ions S including product ions generated by dissociation in the ion trap 20 are ejected from the ion trap 20 by resonance excitation ejection. The sample-derived ions S ejected from the ion trap 20 enter the detector 30 (the arrow A2).

The gas supplier 23 supplies a cooling gas and a CID gas to the ion trap 20. The gas supply source 230 includes a cooling gas storage container (not shown) containing a cooling gas such as helium and a CID gas storage container (not shown) containing a CID gas such as argon. The compositions of the cooling gas and the CID gas are not limited in particular. The introduction of the cooling gas and the CID gas is controlled by opening and closing of the valve 231 that is provided in the pipeline of these gases and controlled by a device controller 51, described below. The gas introducer 232 preferably includes a pipeline extending to the ion trap 20 and introduces the cooling gas and the CID gas into the ion trap 20 through the pipeline.

While only one pipeline is shown schematically as the gas introducer 232 in FIG. 1, the cooling gas and the CID gas can be introduced into the ion trap 20 through a plurality of different pipelines.

The detector 30 includes a ion detector that includes a conversion dynode, a secondary electron multiplier tube, etc., and detects ions to suitably multiply a detection signal generated by the detection. In the detector 30, entered sample-derived ions S are detected. Data obtained by detection in the detector 30 is referred to as measurement data. A detection signal generated by the detection is converted into a digital signal by an analog/digital (A/D) converter (not shown), output to the information processor 40 as measurement data (the arrow A3) and suitably stored in the storage 43 or the like.

FIG. 2 is a conceptual diagram showing the configuration of the information processor 40. The information processor 40 includes an inputter 41, a communicator 42, a storage 43, an outputter 44 and a controller 50. The controller 50 includes the device controller 51, a data processor 52 and an output controller 53. The device controller 51 includes the first voltage controller 511 and the second voltage controller 512. In FIG. 1, the control of the measurer 100 by the device controller 51 is indicated by the arrow A4.

The information processor 40 includes an information processing apparatus such as an electronic calculator and executes processes such as communication, storage, calculation, etc. in regard to various data in addition to suitably serving as an interface with respect to a user of the ion trap mass spectrometer 1 (hereinafter simply referred to as a "user.")

The information processor 40 may be configured as one device integrated with the measurer 100. Further, part of data used by the ion trap mass spectrometer 1 may be saved in a remote server or the like.

The inputter 41 of the information processor 40 is constituted by an input device such as a mouse, a keyboard, various buttons or a touch panel. The inputter 41 receives information required for controlling an operation of the measurer 100, information required for a process to be executed by the controller 50 and so on from the user.

The communicator 42 of the information processor 40 is constituted by a communication device that can communicate via wireless or wired connection through a network such as the Internet. The communicator 42 suitably transmits and receives necessary data.

The storage 43 of the information processor 40 is constituted by a non-volatile storage medium and stores an analysis condition, measurement data and a program for execution of a process by the controller 50, etc.

The outputter 44 of the information processor 40 is constituted by a display monitor such as a liquid crystal monitor or a printer and displays information relating to measurement of the measurer 100, information obtained by a process of the data processor 52, etc. on the display monitor or prints the information on paper media.

The controller 50 of the information processor 40 is constituted by a processor such as a Central Processing Unit (CPU) and a storage medium such as a memory and functions as a main constituent for an operation of controlling the ion trap mass spectrometer 1. The controller 50 is a processing device that executes a process of controlling a voltage to be applied to each electrode of the ion trap 20, etc. The controller 50 keeps a program stored in the storage 43 or the like in the memory and executes various processes when the program is executed by the processor.

As long as the controller 50 of the present embodiment can execute a process, the physical configuration or the like of the controller 50 is not limited in particular.

The device controller 51 of the controller 50 controls an operation of each component of the measurer 100 based on the information relating to an analysis condition based on the input from the inputter 41 or the like and the information stored in the storage 43.

An angular frequency of a square wave to be applied to the ring electrode 202 by the first voltage applier 21 (FIG. 1) is $\Omega$, and an angular frequency of a sine wave to be applied to the end-cap electrode 201 by the second voltage applier 22 is $\omega$. The device controller 51 sets an angular frequency $\Omega$ of a square wave and an angular frequency $\omega$ of a sine wave based on an m/z of precursor ions that is set based on the user input, etc.

The user may directly input an angular frequency $\Omega$ of a square wave and an angular frequency $\omega$ of a sine wave via the inputter 41.

The device controller 51 acquires an m/z of precursor ions input by the user. Alternatively, the device controller 51 may automatically detect a peak intensity, a peak having a large peak area or the like from data (hereinafter referred to as MS1 mass spectrum data) corresponding to a mass spectrum obtained by mass separation without dissociation of an ionized sample to acquire an m/z corresponding to the peak. Here, in the MS1 mass spectrum data, an m/z is associated with an intensity of detected ions having the m/z. A peak intensity is a maximum intensity of a peak, and a peak area is an area of a peak.

Ion behavior is described by the Matthew equation. In the Matthew equation, stability of ions is evaluated based on a parameter 'a' and a parameter 'q.' Letting an average value of a square-wave voltage be U, letting an amplitude of a square-wave voltage (a half of the difference between a maximum value and a minimum value of voltage) be V and letting an inscribed radius of the ring electrode 202 be $r_0$, the parameter 'a' and the parameter 'q' are respectively expressed by the following formulas (1) and (2) (see Non-Patent Document 3.)

$$a=8U/((m/z)(r_0)^2\Omega^2) \quad (1)$$

$$b=4U/((m/z)(r_0)^2\Omega^2) \quad (2)$$

Letting an average value U of a voltage applied to the ring electrode 202 be 0, the parameter 'a' is 0. At this time, a maximum value $q_0$ of 'q' that satisfies a stability condition led by the Matthew equation is 0.7125. Therefore, letting an m/z which is a threshold value of LMCO be $(m/z)_{LMCO}$, and letting an m/z of precursor ions be $(m/z)_{PRE}$, the formula (2) leads the presence of their relationship expressed by the following formula (3).

$$q/q_0=(m/z)_{LMCO}/(m/z)_{PRE} \quad (3)$$

In a case in which the ratio of an m/z which is the threshold value of LMCO to an m/z of precursor ions is set in advance, the device controller 51 can calculate the parameter 'q' of precursor ions based on the formula (3).

The device controller 51 may be configured to set the ratio of an m/z which is the threshold value of LMCO to an m/z of precursor ions based on the user input.

Suppose that the m/z of the right part of the formula (2) is $(m/z)_{PRE}$, and an amplitude V of a square wave is fixed. The device controller 51 can calculate the angular frequency Ω of a square wave using the formula (2) based on the calculated parameter 'q' and $(m/z)_{PRE}$ which is an m/z of precursor ions.

Letting a secular frequency in regard to resonance excitation of ions be $\omega_s$, $\omega_s$ is calculated by the following formula (4) with use of a parameter β.

$$\omega_s=\beta\Omega/2 \quad (4)$$

Here, the parameter β is calculated by the following formula (5) (see Non-Patent Document 3).

$$\beta=\arccos(\cos(\pi(q/2)^{0.5})\cos h(\pi(q/2)^{0.5}))/\pi \quad (5)$$

Therefore, the device controller 51 can calculate the parameter β of precursor ions using the formula (5) based on the above-mentioned calculated parameter 'q,' and can calculate the secular frequency $\omega_s$ of precursor ions based on the parameter β and the calculated angular frequency Ω, described above, of the square wave.

The order of calculation of the above-mentioned parameters q and β, an angular frequency Ω of a square wave, etc. by the device controller 51 is not limited in particular. Further, each value of the above-mentioned calculated angular frequency ω and the like may be adjusted with use of calibration data suitably obtained by actual measurement. Further, even in a case in which the parameter 'a' is not 0, the device controller 51 can calculate a secular frequency $\omega_s$ using the Matthew equation and data relating to the stability of the parameters 'a' and 'q.'

The first voltage controller 511 of the device controller 51 applies a voltage to the ring electrode 202 by controlling the first voltage applier 21. The first voltage controller 511 controls the switcher 212, such that a DC voltage output from the DC power supply 211 is switched at a frequency equivalent to an angular frequency Ω (Ω/2π in a case in which the switch from a high voltage to a low voltage and the switch from a low voltage to a high voltage is taken as one set) when sample-derived ions S are introduced into the ion trap 20. Thus, a square-wave voltage is applied to the ring electrode 202.

In regard to the frequency at which the switcher 212 switches a DC voltage, the difference of plus or minus 5% or the like with respect to the frequency equivalent to the angular frequency Ω may be suitably allowed.

The second voltage controller 512 of the device controller 51 applies a sine-wave voltage to the end-cap electrode 201 by controlling the second voltage applier 22. The second voltage controller 512 preferably applies a single sine wave having a predetermined angular frequency ω to the end-cap electrode 201. Theoretically, it is preferable from the point of view of efficient resonant excitation that the angular frequency ω of a sine wave is set to a secular frequency $\omega_s$. However, due to a change of a waveform representing a square wave caused by low stray capacitance or the like of a circuit that constitutes the first voltage applier 21 or influence of deceleration of ions caused by collision with a CID gas, the second voltage controller 512 can set the angular frequency ω of a sine wave to a value in a predetermined range based on the secular frequency $\omega_s$. The second voltage controller 512 can set the angular frequency ω of a sine wave to not less than 95% and less than 105% of the secular frequency $\omega_s$ and can preferably set the angular frequency ω a sine wave to not less than 97% and less than 103% of the secular frequency $\omega_s$.

The second voltage controller 512 outputs a digital sine-wave signal having the angular frequency ω to the second voltage applier 22 when dissociation is performed, in a control program for controlling the operation of each component of the measurer 100 based on an analysis condition set based on the user input or the like. The second voltage controller 512 controls the second voltage applier 22, converts this digital signal by D/A conversion and applies the signal to the end-cap electrode 201 (see FIG. 3).

The second voltage controller 512 applies a sine-wave voltage to the end-cap electrode 201 preferably when an m/z of precursor ions is equal to or larger than 2500, more preferably when the m/z of precursor ions is equal to or larger than 2400, even more preferably when the m/z of precursor ions is equal to or larger than 1100 and the most preferably when the m/z of precursor ions is equal to or larger than 1000. The second voltage controller 512 may change a waveform representing a voltage applied to the end-cap electrode 201 via the second voltage applier 22 based on an m/z value of precursor ions. Here, "change of a waveform" refers to a change in shape of waveform and does not include a change in period or amplitude. For example, in a case in which an m/z of precursor ions is larger than predetermined threshold values such as 2500, 2400, 1100 or 1000, the second voltage controller 512 applies a sine-wave voltage to the end-cap electrode 201. In a case in which the m/z of precursor ions is equal to or smaller than a predetermined threshold value, the second voltage controller 512 can apply a square-wave voltage having a frequency obtained by division of the above-mentioned square-wave voltage other than a sine-wave voltage to the end-cap electrode 301.

The data processor 52 of the controller 50 executes a process of examining measurement data output from the detector 30. The data processor 52 generates data corresponding to a mass spectrum that associates an m/z with an intensity of detected ions having the m/z based on the measurement data. The data processor 52 can create data corresponding to a product ion spectrum which is a mass spectrum including a peak of product ions of sample-derived ions S obtained by the above-mentioned dissociation. The method of processing data by the data processor 52 is not limited in particular, and identification, a quantitative analysis or the like of molecules corresponding to the above-mentioned peak can be performed suitably.

The output controller 53 of the controller 50 creates an output image representing a product ion spectrum created by the data processor 52 or an analysis condition or the like of the measurer 100, outputs the output image to the outputter 44 and causes the outputter 44 to display the output image in the display monitor.

Figure 4:
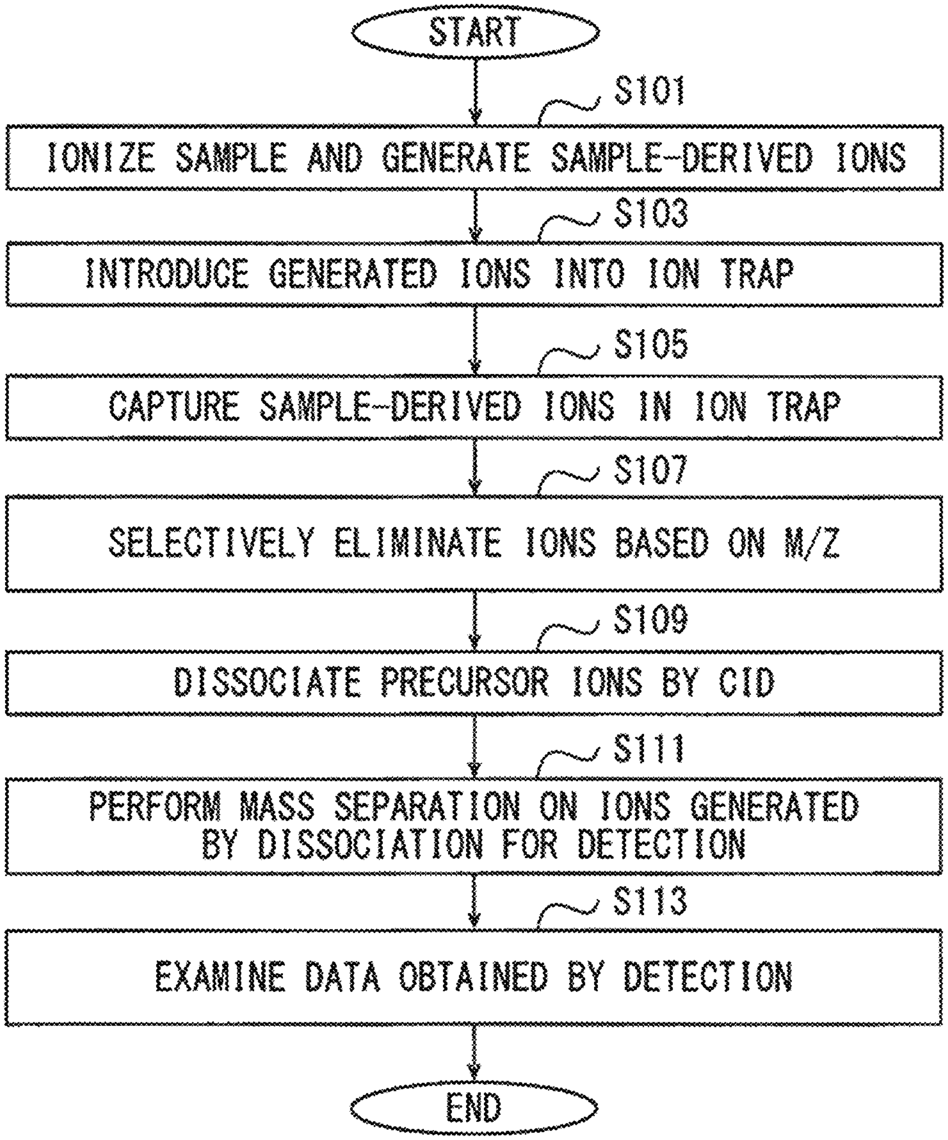
FIG. 4 is a flowchart showing a flow of a mass spectrometry method according to the one embodiment.

FIG. 4 is a flowchart showing a flow of a mass spetrometry method according to the present embodiment. In the step S101, the device controller 51 controls the ionizer 10 to ionize a sample and generates sample-derived ions S. When the step S101 ends, the step S103 is started.

In the step S103, the device controller 51 applies a voltage to an extraction electrode (not shown) or the like, and introduces the sample-derived ions S to the ion trap 20 by the effect of an electric field generated by the voltage, or the like. When the step S103 ends, the step S105 is started. In the step S105, the first voltage controller 511 applies a square wave to the ring electrode 202 and captures the sample-derived ions S in the ion trap 20. When the step S105 ends, the step S107 is started.

In the step S107, the device controller 51 eliminates some of the ions captured in the ion trap 20 based on an m/z. The second voltage controller 512 applies an FNF signal, a SWIFT signal or the like to the end-cap electrode via the second voltage applier 22, thereby reducing the ions other than precursor ions while capturing the precursor ions in the ion trap 20. When the step S107 ends, the step S109 is started.

As long as precursor ions can be separated with desired accuracy, the step S107 does not have to be performed.

In the step S109, the device controller 51 controls the gas supplier 23 to introduce a OD gas into the ion trap 20, and the second voltage controller 512 controls the second voltage applier 22 to apply a sine wave to the end-cap electrode 201, thereby dissociating the precursor ions by the OD. When the step S109 ends, the step S111 is started. In the step S111, the device controller 51 performs mass separation on product ions generated by dissociation and detect ions on which mass separation has been performed. When the step S111 ends, the step S113 is started.

In the step S113, the data processor 52 examines measurement data obtained by detection. When the step S113 ends, the process ends.

Following modifications is in the scope of the present invention and can be combined with the above-mentioned embodiment. In the below-mentioned modified example, parts having structure and functions similar to those of the above-mentioned embodiment are denoted with the same reference numerals, and a description will suitably be not repeated.

Modified Example 1

The ion trap mass spectrometer 1 of the above-mentioned embodiment is configured to include only the ion trap as a mass spectrometry device. However, the ion trap mass spectrometer 1 can include any one or more than one mass spectrometry devices in addition to the ion trap 20. Alternatively, the ion trap mass spectrometer 1 may be connected to a gas chromatograph or a liquid chromatograph or the like. The term "ion trap mass spectrometer" in the above-mentioned embodiment represents these or a combination of these. The ion trap mass spectrometer 1 is preferably an ion-trap time-of-flight mass spectrometer. In this case, it is preferable that sample-derived ions S generated by dissociation are not ejected by resonant excitation ejection but are ejected non-selectively regardless of an m/z and are subjected to mass separation by the time-of-flight mass spectrometer. Further, although mass spectrometry is performed in two steps in the above-mentioned embodiment, dissociation may be performed twice or more, and mass separation may be performed in three steps or more.

Modified Example 2

In the above-mentioned embodiment, the amplitude of a sine wave applied by the second voltage controller 512 via the second voltage applier 22 may be input by the user via the inputter 41. The user can input a numerical value in a display element such as a text box displayed in the display screen of the outputter 44 by the control of the output controller 53 using a keyboard, a touch panel or the like. Alternatively, the user may select a numerical value from a drop-down list or the like displayed in the above-mentioned display screen by the control of the output controller 53. The second voltage controller 512 functions as a setter that sets the amplitude of a sine-wave voltage based on the user input.

Modified Example 3

A program for implementing an information processing function of the ion trap mass spectrometer 1 may be recorded in a computer-readable recording medium. A computer system may read the program, which is recorded in the recording medium, in regard to the control of a process to be executed by the above-mentioned device controller 51 and its related processes and execute the program. As used herein, the term "computer system" includes hardware such as an OS (Operating System) or peripheral appliances. Further, the term "computer-readable recording medium" refers to a movable recording medium such as a flexible disc, an optical magnetic disc, an optical disc or a memory card and a storage device such as a hard disc or an SSD (Solid State Drive) built into the computer system. Further, the term "computer-readable recording medium" may include an object that retains a program movably for a short period of time such as a communication wire that is used when a program is transmitted through a network such as the Internet or a communication line such as a telephone line, or an object that retains a program for a certain period of time such as a volatile memory in a computer system that serves as a server or a client. Further, the above-mentioned program may be to implement part of the above-mentioned functions and may further be to implement the above-mentioned functions by being combined with a program that has already been recorded in the computer system.

Figure 5:
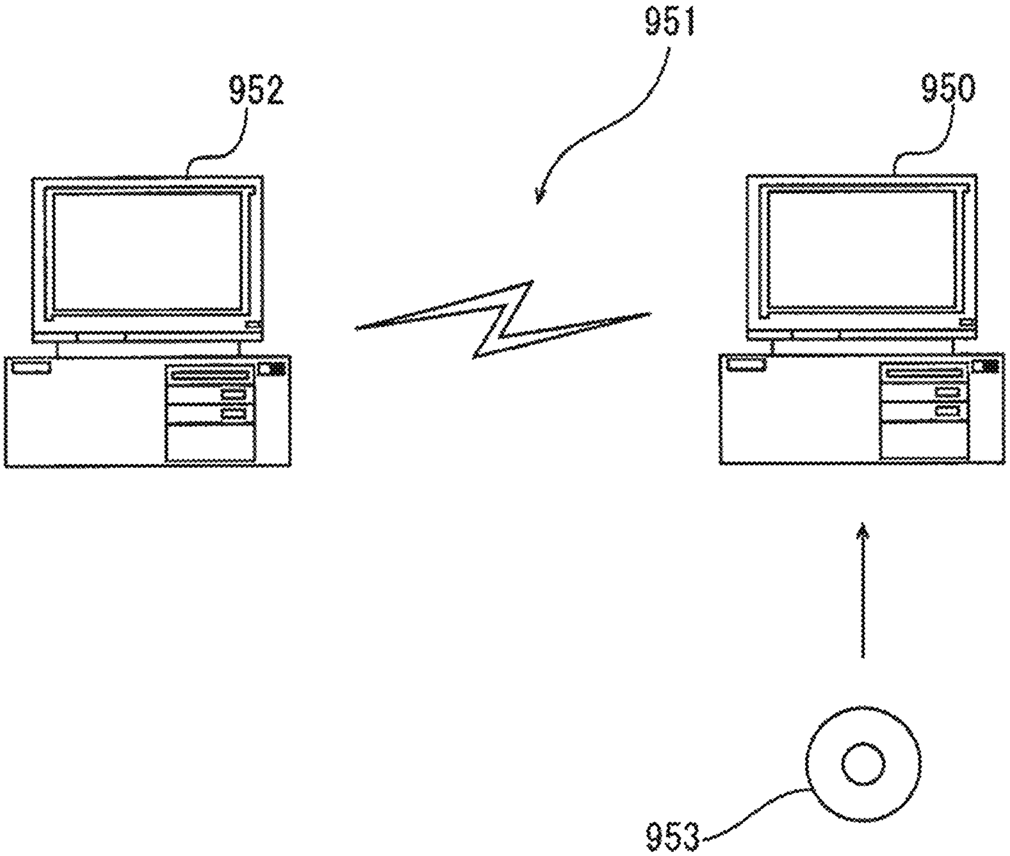
FIG. 5 is a conceptual diagram for explaining provision of a program.

Further, in a case in which being applied to a personal computer (hereinafter referred to as a PC), the program relating to the above-mentioned control can be provided via a recording medium such as a DVD-ROM, or a data signal such as the Internet. FIG. 5 is a diagram showing the appearance. A PC 950 receives a program via a DVD-ROM 953. Further, the PC 950 has a function to be connected to a communication line 951. The computer 952 is a server computer that provides the above-mentioned program and stores the program in a recording medium such as a hard disc. The communication line 951 is a communication line such as the Internet or a personal computer communication, or a dedicated communication line. The computer 952 reads a program with the use of a hard disc and transmits the program to the PC 950 through the communication line 951. That is, the program is transported by a carrier wave as a data signal and transmitted through the communication line 951. In this manner, the program can be provided as a computer-readable computer program product in various forms such as a recording medium or a carrier wave.

(Aspects)

It is understood by those skilled in the art that the plurality of above-mentioned illustrative embodiments or modifications are specific examples of the below-mentioned aspects.

(Item 1) An ion trap mass spectrometer according to one aspect includes an ion trap including a first electrode and a second electrode different from the first electrode, a first voltage controller that periodically switches a DC voltage among DC voltages having a plurality of different values and apply the DC voltages to the first electrode, and a second voltage controller that applies a sine-wave voltage to the second electrode when ions captured in the ion trap are dissociated. Thus, mass spectrometry can be performed accurately when ions are dissociated with use of the ion trap.

(Item 2) The ion trap mass spectrometer according to another aspect, wherein a frequency of the sine-wave voltage is a frequency based on a secular frequency of the ions. This promotes resonant excitation, so that mass spectrometry can be performed more accurately.

(Item 3) The ion trap mass spectrometer according to another aspect, wherein the first voltage controller captures the ions in the ion trap by applying a square-wave voltage to the first electrode, and the second voltage controller performs Collision-Induced Dissociation of the ions by applying a sine-wave voltage to the second electrode. Thus, mass spectrometry can be performed accurately and more reliably.

(Item 4) The ion trap mass spectrometer according to another aspect, further comprising a setter that sets an amplitude of the sine-wave voltage based on user input. Thus, the amplitude of a sine wave can be adjusted according to an analysis condition or the like, and mass spectrometry can be performed accurately in various cases.

(Item 5) The ion trap mass spectrometer according to another aspect, wherein the second voltage controller applies voltages represented by different waveforms to the second electrode based on an m/z of ions to be dissociated. Thus, a voltage to be applied to the second electrode can be adjusted according to dissociated ions, and mass spectrometry can be performed accurately in various cases.

(Item 6) A mass spectrometry method according to another aspect with which an ion trap mass spectrometer including an ion trap, including a first electrode and a second electrode different from the first electrode, is used, includes periodically switching a DC voltage among DC voltages having a plurality of different values and applying the DV voltages to the first electrode, and applying a sine-wave voltage to the second electrode when ions captured in the ion trap are dissociated. Thus, mass spectrometry can be performed accurately when ions are dissociated with use of the ion trap.

(Item 7) A non-transitory computer readable medium storing a control program according to one aspect causes a processing device to execute a process of controlling an ion trap mass spectrometer including an ion trap including a first electrode and a second electrode different from the first electrode, and the process includes a first voltage control process of periodically switching a DC voltage among DC voltages having a plurality of different values and applying the DC voltages to the first electrode, and a second voltage control process of applying a sine-wave voltage to the second electrode when ions captured in the ion trap are dissociated, and the control program causes a computer to execute the process. Thus, mass spectrometry can be performed accurately when ions are dissociated with use of the ion trap.

The present invention is not limited to the contents of the above-mentioned embodiment. Other aspects are possible without departing from the spirit and scope of the present invention.

INVENTIVE EXAMPLES

While the inventive examples are shown below, the present invention is not limited to analysis conditions or the like in the below-mentioned inventive examples.

Inventive Example 1

A sample including Angiotensin 2 (50 fmol) which was peptide was ionized, the generated ions were captured in a digital ion trap, and the captured ions were subject to the CID by application of a sine wave to an end-cap electrode. A parameter β was 0.3331. Thereafter, a product ion spectrum of product ions generated by the CID was created. As an ion trap mass spectrometer, a device having the similar configuration to that of a Digital Ion Trap Mass Spectrometer MALDImini-1 (Shimadzu Corporation) was used. An m/z of precursor ions was 1046.

Figure 6:
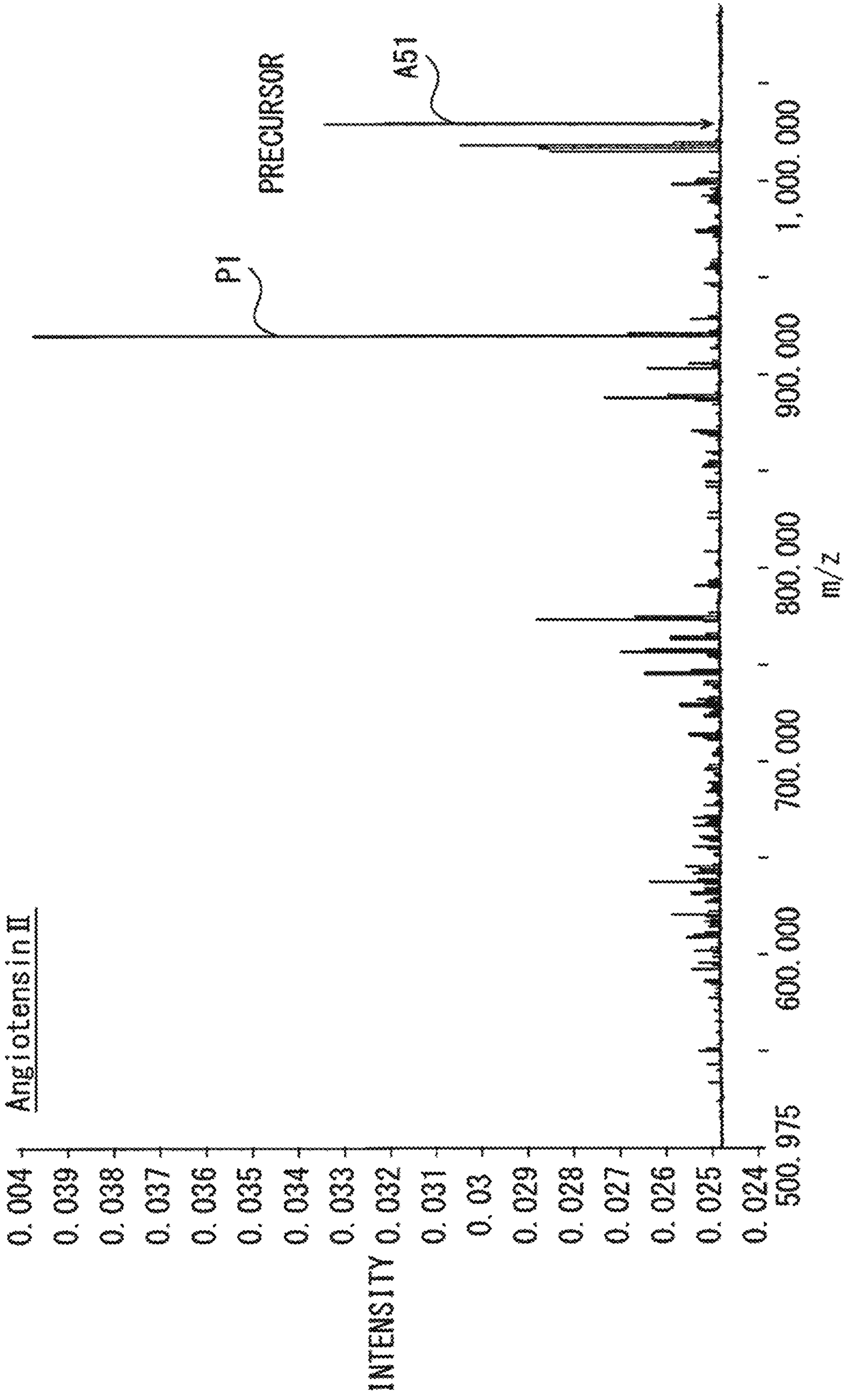
FIG. 6 is a product ion spectrum of Angiotensin 2 in an inventive example 1.

FIG. 6 is a diagram showing a product ion spectrum obtained in the present inventive example. In regard to a product ion spectrum, the abscissa indicates an m/z of detected ions, and the ordinate indicates an intensity of a detection signal of the ions. The same applies to the following diagrams. In FIG. 6, the m/z of precursor ions is schematically indicated by the arrow A51. A peak P1 is a peak of product ions having the highest intensity and corresponds to y-series ions (y7). The peak intensity of the peak P1 was 0.01475, and RMS (Root Mean Square) of noise of a baseline was 0.0006024. A Signal-to-Noise ratio (S/N ratio) was calculated to be 244.8 by division of a peak intensity by RMS.

Comparative Example 1

A sample including Angiotensin 2 was ionized, the generated ions were captured in a digital ion trap, and the captured ions were subjected to the CID by application of a square wave to an end-cap electrode. A square wave applied to the end-cap electrode was ⅙ of the square wave applied to the ring electrode. This is equivalent to a parameter=0.3333. Thereafter, a product ion spectrum of product ions generated by the CID was created. The rest of the conditions was similar to those of the inventive example 1.

Figure 7:
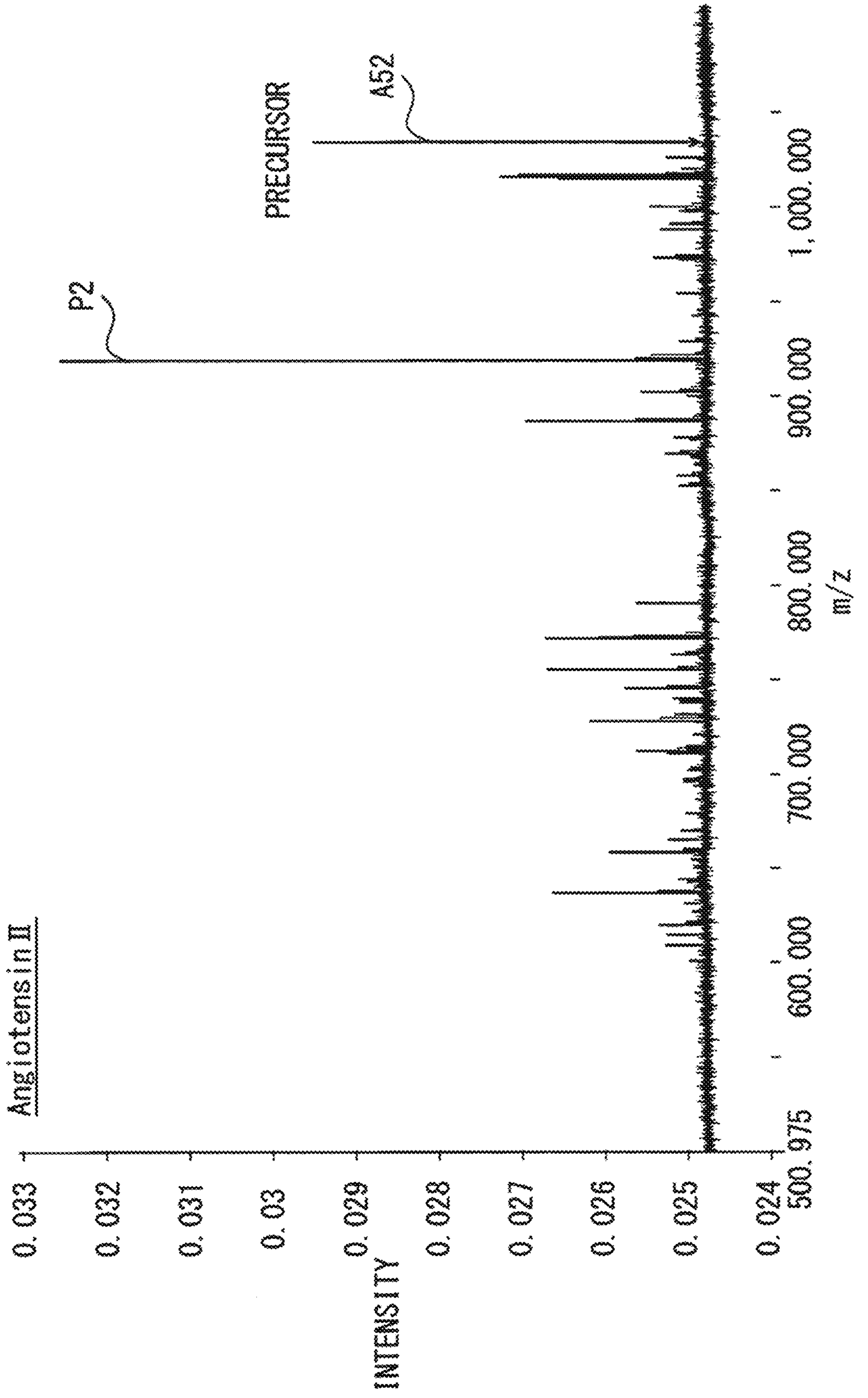
FIG. 7 is a product ion spectrum of Angiotensin 2 in a comparative example 1.

FIG. 7 is a diagram showing a product ion spectrum obtained in the present comparative example. In FIG. 7, the m/z of precursor ions is schematically indicated by the arrow A52. A peak P2 is a peak of product ions having the highest intensity and corresponds to y-series ions (y7). The peak intensity of the peak P2 was 0.007777, and RMS of noise of a baseline was 0.00003767. An S/N ratio was calculated to be 206.5 by division of a peak intensity by RMS.

The S/N ratio in the inventive example 1 was higher than the S/N ratio in the comparative example 1. When the product ion spectrum of the inventive example 1 is compared to the product ion spectrum of the comparative example 1, the patterns of peaks corresponding to product ions were substantially similar.

Inventive Example 2

A sample including peptide made of 18th to 39th amino acids of adrenocorticotropic hormone (ACTH) (hereinafter referred to as ACTH (18-39)) (100 fmol) was ionized, the generated ions were captured in a digital ion trap, and the captured ions were subjected to the CID by application of a sine wave to an end-cap electrode. A parameter β was 0.3331. Thereafter, a product ion spectrum of product ions generated by the CID was created. An m/z of precursor ions was 2465. The rest of the conditions was similar to those of the inventive example 1.

Figure 8:
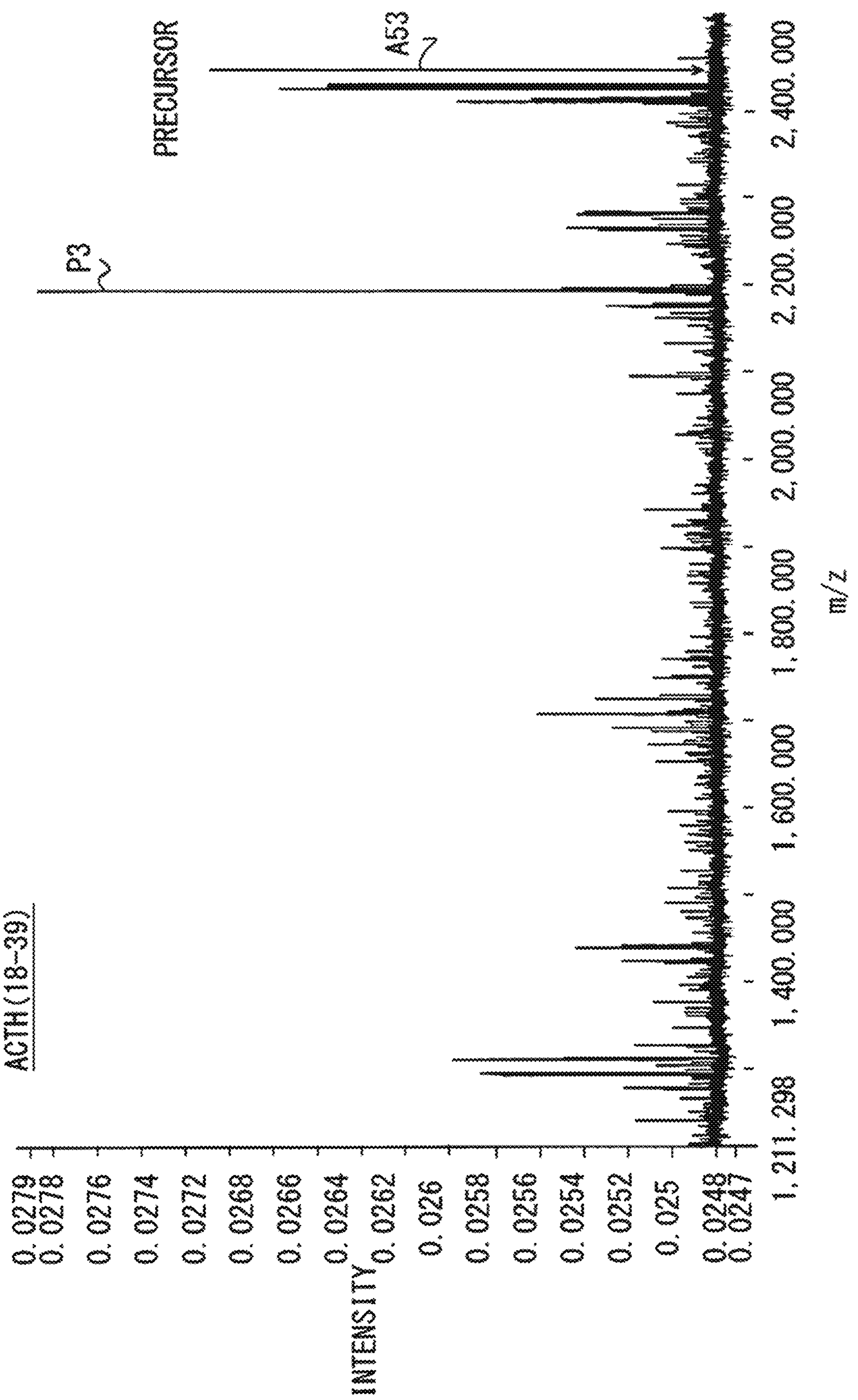
FIG. 8 is a product ion spectrum of ACTH (18-39) in an inventive example 2.

FIG. 8 is a diagram showing a product ion spectrum obtained in the present inventive example. In FIG. 8, the m/z of precursor ions is schematically indicated by the arrow A53. A peak P3 is a peak of product ions having the highest intensity and corresponds to y-series ions (y20). The peak intensity of the peak P2 was 0.03017, and RMS of noise of a baseline was 0.0003855. An S/N ratio was calculated to be 78.3 by division of a peak intensity by RMS.

Comparative Example 2

A sample including ACTH (18-39) was ionized, the generated ions were captured in a digital ion trap, and the captured ions were subjected to the CID by application of a square wave to an end-cap electrode. A square wave applied to the end-cap electrode was ⅙ of the square wave applied to the ring electrode. This is equivalent to a parameter=0.3333. Thereafter, a product ion spectrum of product ions generated by the CID was created. The rest of the conditions was similar to those of the inventive example 1.

Figure 9:
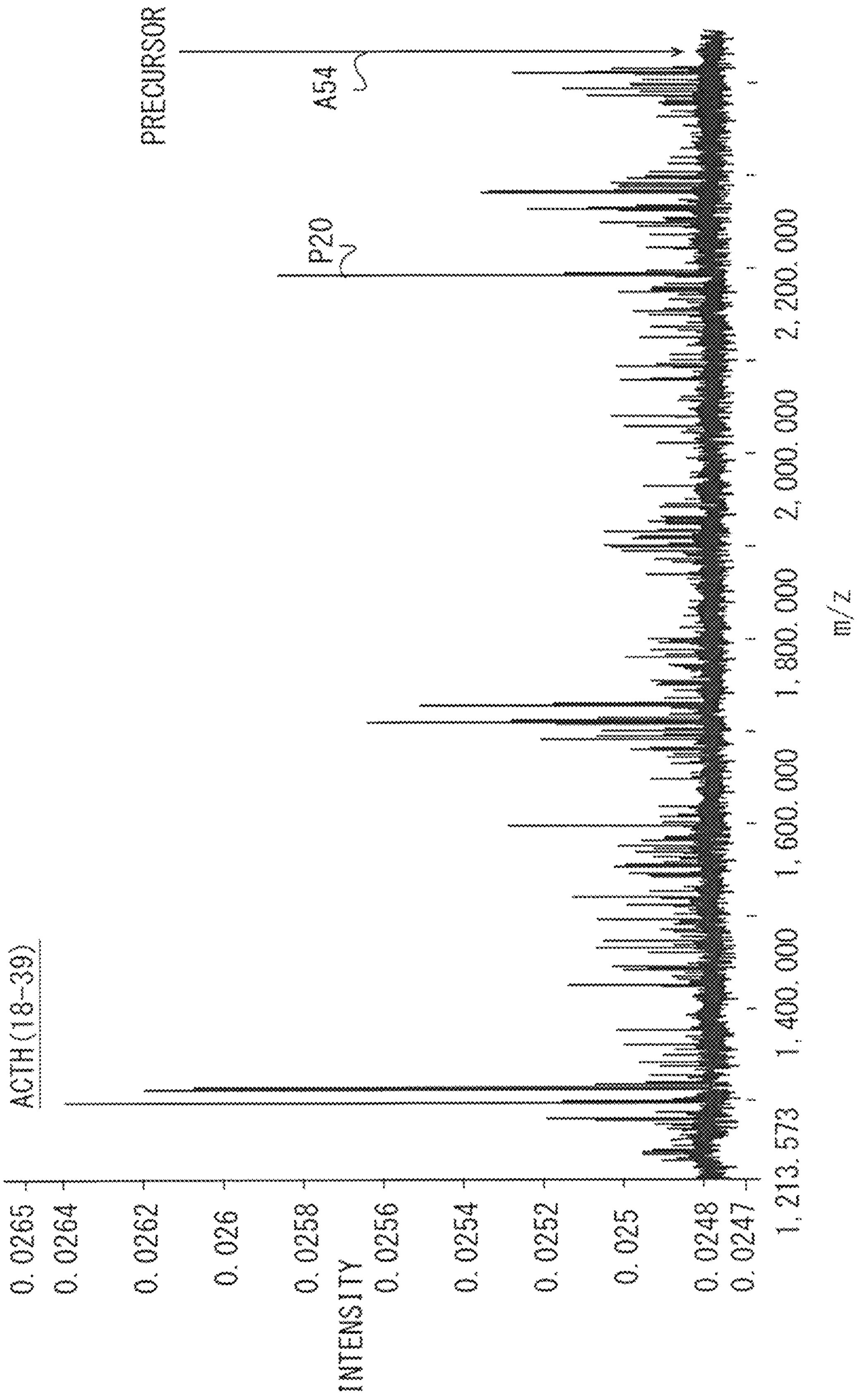
FIG. 9 is a product ion spectrum of ACTH (18-39) in a comparative example 2.

FIG. 9 is a diagram showing a product ion spectrum obtained in the present inventive example. In FIG. 9, the m/z of precursor ions is schematically indicated by the arrow A54. A peak P4 is a peak of product ions having the highest intensity and corresponds to y-series ions (y20). The peak intensity of the peak P4 was 0.001090, and RMS of noise of a baseline was 0.00003973. An S/N ratio was calculated to be 27.4 by division of a peak intensity by RMS.

The S/N ratio in the inventive example 2 was higher than the S/N ratio in the comparative example 2, and its difference was larger than the difference between the inventive example 1 and the comparative example 1. When the product ion spectrum of the inventive example 2 was compared to the product ion spectrum of the comparative example 2, their patterns of peaks corresponding to product ions were different.

The content of the disclosure of the following application, upon which priority is claimed, is hereby included herein by reference: Japanese Patent Application 2019-177979, filed on Sep. 27, 2019.

REFERENCE SIGNS LIST

1 . . . Ion trap mass spectrometer, 10 . . . Ionizer, 20 . . . Ion trap, 21 . . . First voltage applier, 22 . . . Second voltage applier, 23 . . . Gas supplier, 30 . . . Detector, 40 . . . Information processor, 41 . . . Inputter, 50 . . . Controller, 51 . . . Device controller, 100 . . . Measurer, 211 . . . DC power supply, 212 . . . Switcher, 201 . . . End-cap electrode, 201*a* . . . Inlet end-cap electrode, 201*b* . . . Outlet end-cap electrode, 202 . . . Ring electrode, 511 . . . First voltage controller, 512 . . . Second voltage controller, S . . . Sample derived ions, W1, W2, W22 . . . Waveforms representing voltages.

The invention claimed is:

1. An ion trap mass spectrometer comprising:
- an ion trap including a first electrode and a second electrode different from the first electrode;
- a first voltage controller that periodically switches a DC voltage among DC voltages having a plurality of different values and apply the DC voltages to the first electrode; and
- a second voltage controller that applies a sine-wave voltage to the second electrode when ions captured in the ion trap are dissociated,
- wherein the first voltage controller captures the ions in the ion trap by applying a square-wave voltage to the first electrode.

2. The ion trap mass spectrometer according to claim 1, wherein
- the second voltage controller performs Collision-Induced Dissociation of the ions by applying a sine-wave voltage to the second electrode.

3. The ion trap mass spectrometer according to claim 1, further comprising a setter that sets an amplitude of the sine-wave voltage based on user input.

4. The ion trap mass spectrometer according to claim 1, wherein
- the second voltage controller applies voltages represented by different waveforms to the second electrode based on an m/z of ions to be dissociated.

5. A mass spectrometry method with which an ion trap mass spectrometer including an ion trap, including a first electrode and a second electrode different from the first electrode, is used, including:
- periodically switching a DC voltage among DC voltages having a plurality of different values and applying the DV voltages to the first electrode;
- applying a sine-wave voltage to the second electrode when ions captured in the ion trap are dissociated; and
- capturing the ions in the ion trap by applying a square-wave voltage to the first electrode.

6. An ion trap mass spectrometer comprising:
- an ion trap including a first electrode and a second electrode different from the first electrode;
- a first voltage controller that periodically switches a DC voltage among DC voltages having a plurality of different values and apply the DC voltages to the first electrode; and
- a second voltage controller that applies a sine-wave voltage to the second electrode when ions captured in the ion trap are dissociated,
- wherein a frequency of the sine-wave voltage is a frequency based on a secular frequency of the ions.

7. A non-transitory computer readable medium storing a control program for causing a processing device to execute a process of controlling an ion trap mass spectrometer including an ion trap including a first electrode and a second electrode different from the first electrode,
- the process including:
  - a first voltage control process of periodically switching a DC voltage among DC voltages having a plurality of different values and applying the DC voltages to the first electrode;
  - a second voltage control process of applying a sine-wave voltage to the second electrode when ions captured in the ion trap are dissociated; and capturing the ions in the ion trap by applying a square-wave voltage to the first electrode, and the control program causing a computer to execute the process.

* * * * *